Jan. 30, 1934.  G. M. GORDON  1,945,145
METHOD OF AND APPARATUS FOR COMPACTING AND
DEWATERING CEMENTITIOUS MIXTURES
Filed April 4, 1932  2 Sheets-Sheet 1

GRAHAM M. GORDON.
INVENTOR.

BY

ATTORNEY.

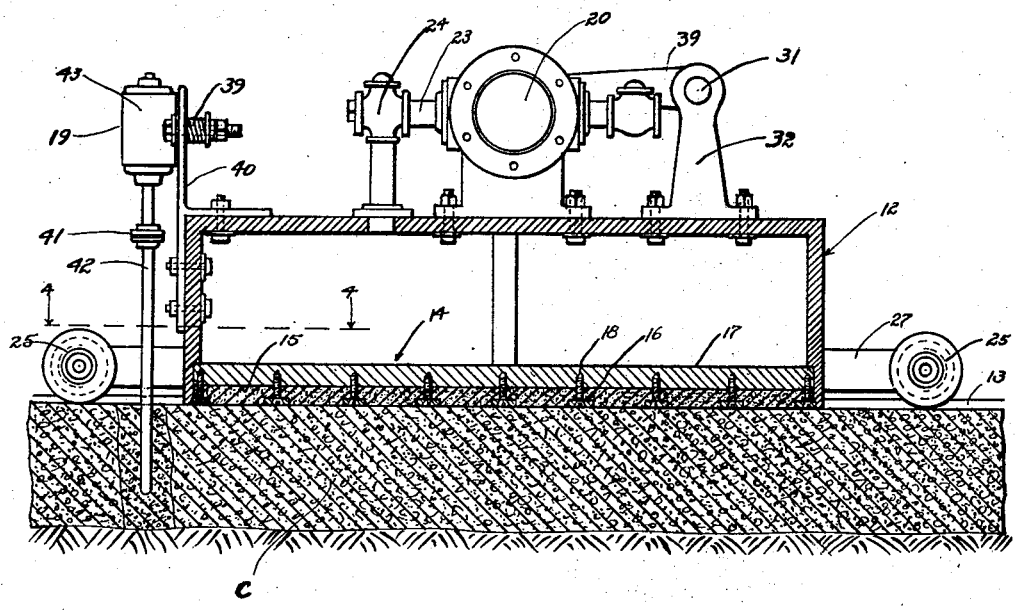
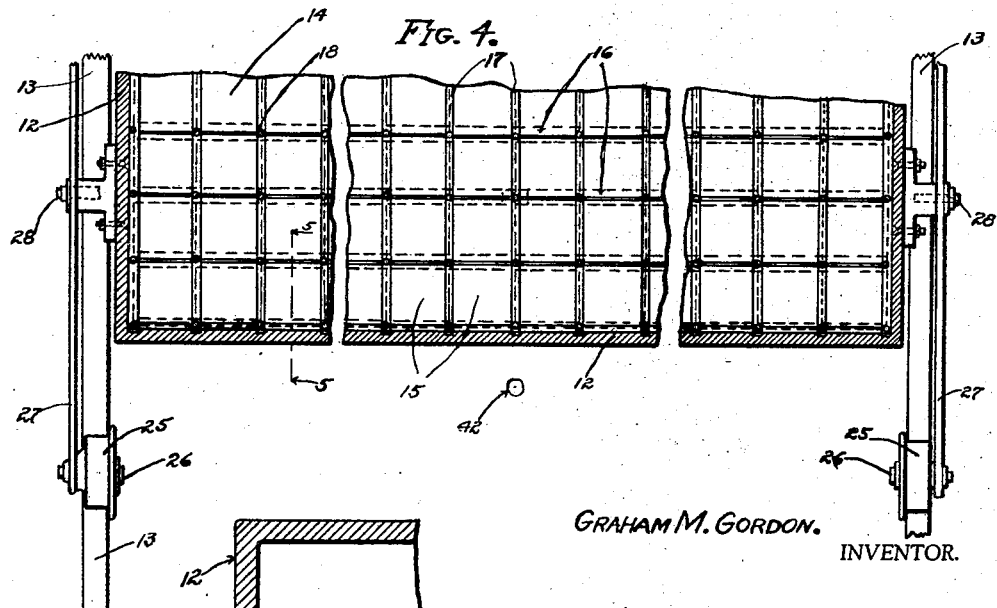

Patented Jan. 30, 1934

1,945,145

UNITED STATES PATENT OFFICE 1,945,145

METHOD OF AND APPARATUS FOR COMPACTING AND DEWATERING CEMENTITIOUS MIXTURES

Graham M. Gordon, Los Angeles, Calif., assignor to Viber Company, Limited, Los Angeles, Calif., a corporation Application April 4, 1932. Serial No. 603,015

9 Claims. (Cl. 94—48)

This invention relates generally to a method and apparatus for dewatering and compacting cementitious and plastic masses.

It is well understood that for the easy handling of cementitious mixtures such as Portland cement concrete, it is necessary to add sufficient water to produce a plastic mass. If less water is added, the mixture is harsh, and if too much water is used the finer particles tend to separate from the coarser rocks. On the other hand, it is now generally recognized that after the concrete mixture is properly placed in forms, or the like, in compact form free from segregations of any of the ingredients, its final strength after curing is roughly inversely proportional (within limits) to the water remaining in the mixture at setting, and participating in the chemical reactions of setting and hardening. Sufficient water to give plasticity or easy working in a concrete mixture is commonly more than the amount required to give the maximum cured strength.

It has been demonstrated that in a wet cementitious mixture, that intense vibration causes the water to move toward the point of vibration, and wherever physically possible this excess water will come to the top surface. The effect of vibration is apparently to settle the irregular shaped and sized particles into positions giving maximum density or packing, thereby releasing water from the larger interstices between the particles before being settled to maximum packing. I have found that a vibrating mechanism inserted within the wet mixtures is most effective and in particular when combined with means for removal of the excess water as further detailed below.

It is, therefore, an object of this invention to provide a method of treating fresh concrete whereby the excess water used to give plasticity and easy working, may be effectively removed from the unset mass to insure the development of maximum strength in the concrete in place.

Another object is to provide an apparatus for partly dewatering plastic masses, and imparting vibration thereto to assist in the dewatering and for compaction of the mass.

Other objects and advantages will be apparent from the following description, reference being made to the accompanying drawings in which:—

Fig. 3 is a vertical section taken substantially on the line 3—3 of Fig. 1.

Fig. 4 is a horizontal section taken substantially on the line 4—4 of Fig. 3.

Fig. 5 is a fragmentary vertical section taken on the line 5—5 of Fig. 4.

Figure 1:
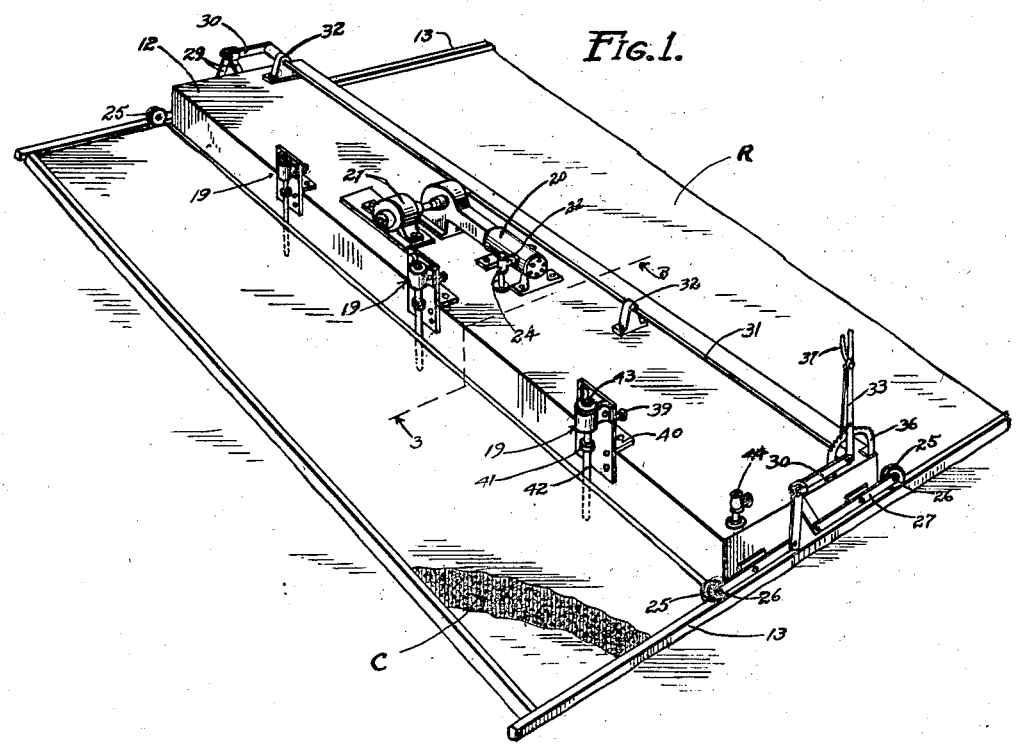
Fig. 1 is a perspective view showing the apparatus of the invention as it appears in operation on a road-bed.
Figure 2:
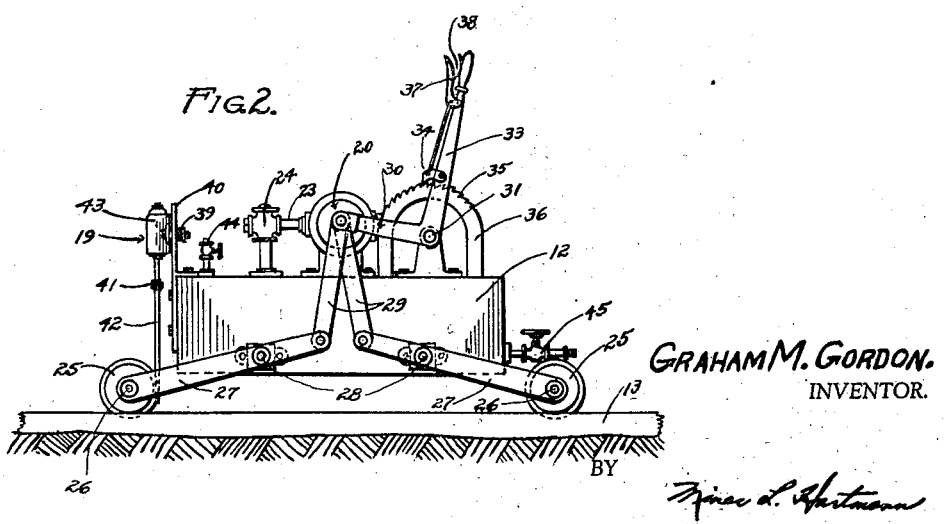
Fig. 2 is a side elevation of the apparatus in raised position.

This invention has been described and illustrated by way of example, in connection with the construction of concrete highways, but it will be readily understood that it may be applied to the dewatering and compaction of concrete in other situations, as for example in sidewalks, floors, roof-decks and other masses of concrete or cementitious compositions.

Referring more specifically to the drawings, the apparatus consists of a hollow member preferably in the form of a rectangular suction box or chamber 12. Member 12 is of sufficient length to extend between the head boards, 13, employed in the formation of a concrete roadway designated as R, and is provided on the under side with a filtering surface, 14, adapted to engage the surface of the concrete designated as C, after the wet mixture is poured or placed in the prepared roadway between the headboards 13.

Filtering surface 14 preferably consists of prepared porous ceramic filter plates, 15, held in place by longitudinal bars, 16, fastened to spaced structural metal crossbars, 17, by countersunk screws 18. Crossbars 17 are rigidly secured at their ends to the walls of the main chamber or suction box, 12.

The filter plates, 15, may be recessed and specially shaped so that the filtering surface in contact with the concrete is essentially a relatively smooth plain surface; or if desired bars 17 and the plates 15, may be elevated or lowered so that grooves or squares or other simple patterns may be formed; or the filter plates themselves may have engraved or raised designs which may be transferred, in reverse, on the concrete. Other means of securing the filtering plates to the chambered member may be employed, and filtering surfaces other than porous ceramic plates may be used. For example, I have found that I may also use for the filtering surface fine mesh metal or canvas filtering cloth, suitably supported by stiff screen mesh or perforated plates.

Excess water in the concrete, brought to the surface by the settling and compaction of the concrete brought about by the internal vibration induced by means of the inserted vibrators 19, is simultaneously removed thru the filtering surface 14, by a suction pump, 20, which provides a partial vacuum within the chamber or suction box 12.

Pump 20, which may be of any suitable character employed for this purpose, may be mounted on top of the chambered means, and is driven by an electric motor 21 or other sources of power. The suction means may be separately located and a flexible pipe or hose connection be made therewith to the suction box of my apparatus without departing from the scope of my invention. In the present illustrative example, the pump is provided with a cylinder 22 connected to the suction chamber 12 by a suction pipe 23 provided with a check valve 24.

The apparatus is adapted to be moved over the roadway progressively as the prepared roadbed is filled with wet concrete mixture, and is provided with flanged rollers, 25, for this purpose, which rollers engage the upper faces of the headboards. The rollers are also connected to the suction box 12 in such a manner that it may be raised or lowered to conform to the depth of concrete and for moving forward after completion of the dewatering and compaction operation on the underlying section of concrete.

Rollers 25 are mounted on inwardly projecting spindles 26, secured to the outer ends of arms 27 pivotally connected as indicated at 28 to the end walls of the suction box, the inner ends of which are connected by links 29 to arms 30 secured to a rock shaft 31 carried by bearings 32 mounted on the upper or top side of the suction box. Formed integral with one of the arms 30, or secured to the rock shaft is a lever 33 provided with a pawl 34 arranged to engage teeth 35 of a ratchet segment 36, the pawl being interconnected with a hand grip 37 which in turn is engaged by a leaf spring 38 which serves to urge the pawl into engagement with the ratchet teeth.

From the foregoing it will be seen that by manipulation of a lever 33 the suction box may be raised from the surface of the concrete to permit its forward movement to another portion of the roadway; also to lower and adjust the same in relation to the position of the concrete surface.

Means for imparting vibration to the concrete to compact the same consists of a plurality of vertically disposed vibrating members, individually actuated, preferably by electric motors. The vibrating mechanism preferred is that described and claimed in Pelton, U. S. Patent No. 1,747,555, which consists essentially of a rotating out-of-balance weight on the inserted end of a shaft, flexibly connected to means of rapid rotation, as an electric motor, the whole being totally enclosed in an outer casing so that it may be inserted within the concrete, and impart its vibratory energy directly thereto. In the present illustrative example, three independent vibratory units 19 are shown, flexibly supported by spring bolts 39 on brackets 40 secured to the top forward longitudinal edge of the suction box. A flexible connection 41 in the outer tubular casing 42 of the vibrating unit gives greater freedom of vibration of the insertable end of said casing, the vibration being caused by the out-of-balance weight revolved in the lower end of the casing 42 by a shaft connection to the motor 43.

Other means for internally vibrating the concrete by inserting within the concrete a source of vibrational energy may be used; internal vibration being specifically differentiated from tapping, pounding, jolting and tamping operations such as those commonly used, both manually and mechanically on the surface of concrete masses.

In operation, the apparatus may be placed over a section of the concrete; the vibrators and suction pump are set in operation, and the apparatus lowered by means of the hand lever 33, and its connected links, levers, shaft and arms, by which procedure the loose concrete material in a more or less plastic state is settled in place, air and water pockets removed by the vibration, and the excess water brought to the surface by the vibration and consequent compaction, is simultaneously drawn off by the suction applied through the filtering surface. The filtering surface prevents the removal of the solid materials of the mixture. After completion of the dewatering and compaction, the vacuum is broken by manipulation of the valves 24 and 44, the apparatus is elevated by means of lever 33, and moved forward on the rollers to the next adjoining area of concrete, where the operation is repeated.

The vibrational energy effect spreads out from each vibrating unit for a distance dependent upon local conditions of depth, mixture and fluidity. It is obvious that in a continued progression of the apparatus as in a roadway, the area under the suction box (omitting the initial setting) will have been vibrated on the rear side by the vibration of the mechanisms on the forward side of the previous setting of the whole apparatus.

The accumulated water in the suction box, if not wholly removed through the vacuum pump, may be removed thru the drain valve 45, as required. It is also obvious that if in the operation of the apparatus it is necessary to use positive air pressure to break the contact between the finished surface and the filter surface, that such positive pressure may be applied to the interior of the suction box by suitable inlets and valves.

The above is illustrative of my method and an example of specific means for carrying out this new method of forming concrete surfaces, but other equivalent means will be readily apparent. For applying my method to the laying of concrete floors, for example, a suction box somewhat smaller than illustrated may be suspended from overhead beams and cables, with suitable pulley attachments for raising and lowering the apparatus, and operating it, upon desired portions of the cementitious mixture spread out for the floor.

Any portable co-operative means for simultaneously vibrating internally an unset cementitious mixture and removing the excess water by suction through a filtering medium to form a compacted partly dewatered mass, is believed to be within the scope of my invention.

I claim:

1. A method of forming a concrete roadway which comprises pouring a plastic concrete mass upon a prepared roadway base, covering a portion of said plastic mass with a chambered member, placing vibratory mechanisms in the contiguous mass, vibrating the mass to compact the same and release excess water, exhausting the air from said chamber, and extracting a portion of the water from said mass.

2. A method of forming a concrete roadway which comprises pouring a plastic concrete mass upon a prepared roadway base, covering a portion of said plastic mass with a vacuum compartment whose surface of contact with said mass is a filtering medium, exhausting the air from said compartment, extracting through said filtering surface a portion of the water, and, simultaneously with said covering and extracting, inserting vibratory means within the contiguous mass, vibrating the mass, and removing said vibrating and extracting means before the setting of the concrete.

3. An apparatus for treating unhardened concrete comprising a vacuum compartment adapted to be placed over a portion of the leveled surface of the concrete mass, a filtering bottom to said vacuum compartment forming the contact with said mass of concrete, suction means operatively connected with said vacuum compartment for exhausting the air therein, and insertable vibrating means carried by said vacuum compartment.

4. An apparatus for treating unhardened concrete comprising a vacuum compartment adapted to be placed over a portion of a leveled surface of the concrete mass, a filtering bottom to said vacuum compartment forming the contact with said mass of concrete, suction means operatively connected with said vacuum compartment, vibratory means carried by said compartment for vibrating the contiguous concrete, and means for raising and lowering said compartment.

5. An apparatus for treating unhardened concrete comprising a vacuum compartment adapted to be placed over a portion of a leveled surface of the concrete mass, a filtering bottom to said vacuum compartment forming the contact with said mass of concrete, suction means operatively connected with said vacuum compartment, vibratory means carried by said compartment for vibrating the contiguous concrete, and means for moving the machine to an untreated portion of the concrete surface.

6. An apparatus for treating unhardened concrete comprising a vacuum compartment adapted to be placed over a portion of a leveled surface of a concrete mass, a filtering bottom to said vacuum compartment forming the contact with said mass of concrete, suction means operatively connected with said vacuum compartment, vibratory means carried by said compartment for vibrating the contiguous concrete, means for raising and lowering said compartment, and means for moving the machine to an untreated portion of the concrete surface.

7. In a paving machine for compacting and dewatering unhardened concrete in place on a roadbed, in combination, a surface-contacting suction means and insertable vibratory mechanisms.

8. In a paving machine for compacting and dewatering unhardened concrete in place on a roadbed, in combination, a surface-contacting suction-filtering means, insertable vibratory mechanisms, and means for raising and lowering said vibratory and said suction means.

9. In a paving machine for compacting and dewatering unhardened concrete in place on a roadbed, in combination, a surface-contacting suction-filtering means, surface pattern-impressing means attached to said filtering surface, insertable vibratory mechanisms, and means for raising and lowering said vibratory and suction means.

GRAHAM M. GORDON.